(12) United States Patent
Chiang et al.

(10) Patent No.: US 11,616,949 B2
(45) Date of Patent: Mar. 28, 2023

(54) METHOD AND APPARATUS OF INTRA PREDICTION WITH MPM GENERATION IN IMAGE AND VIDEO PROCESSING

(71) Applicant: MediaTek Singapore Pte. Ltd., Singapore (SG)

(72) Inventors: Man-Shu Chiang, Hsinchu (TW); Chih-Wei Hsu, Hsinchu (TW); Tzu-Der Chuang, Hsinchu (TW); Ching-Yeh Chen, Hsinchu (TW); Mohammed Golam Sarwer, San Jose, CA (US)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 17/270,245

(22) PCT Filed: Aug. 27, 2019

(86) PCT No.: PCT/CN2019/102827
§ 371 (c)(1),
(2) Date: Feb. 22, 2021

(87) PCT Pub. No.: WO2020/043092
PCT Pub. Date: Mar. 5, 2020

(65) Prior Publication Data
US 2021/0329230 A1    Oct. 21, 2021

Related U.S. Application Data

(60) Provisional application No. 62/725,299, filed on Aug. 31, 2018.

(51) Int. Cl.
*H04N 19/11*    (2014.01)
*H04N 19/176*   (2014.01)
*H04N 19/593*   (2014.01)

(52) U.S. Cl.
CPC .......... *H04N 19/11* (2014.11); *H04N 19/176* (2014.11); *H04N 19/593* (2014.11)

(58) Field of Classification Search
CPC .... H04N 19/167; H04N 19/105; H04N 19/11; H04N 19/593; H04N 19/166; H04N 19/176
See application file for complete search history.

(56) References Cited

U.S. PATENT DOCUMENTS 9,025,661 B2    5/2015  Karczewicz et al.
10,200,719 B2   2/2019  Zhang et al.
(Continued)

FOREIGN PATENT DOCUMENTS

CN   101159874 A    4/2008
CN   103262533 A    8/2013
(Continued)

OTHER PUBLICATIONS

International Search Report and Written Opinion dated Dec. 3, 2019, issued in application No. PCT/CN2019/102827.
(Continued)

*Primary Examiner* — Tsion B Owens
(74) *Attorney, Agent, or Firm* — McClure, Qualey & Rodack, LLP

(57) ABSTRACT

An intra prediction method comprises receiving input data of a current block in a current picture, deriving multiple Most Probable Modes (MPMs) to be included in a MPM list for the current block, setting remaining intra prediction modes as non-MPMs, and encoding or decoding the current block according to a current intra prediction mode selecting from the MPMs and non-MPMs. The first MPM in the MPM list is Planar mode for blocks coded or to be coded in intra prediction, and one or more other MPMs in the MPM list are
(Continued)

derived according to a number of available angular mode of one or more neighboring blocks of the current block.

16 Claims, 6 Drawing Sheets

(56) References Cited

U.S. PATENT DOCUMENTS

| | | | |
|---|---|---|---|
| 10,375,409 | B2 | 8/2019 | Park |
| 10,750,169 | B2 | 8/2020 | Kim et al. |
| 2020/0382768 | A1* | 12/2020 | Kotra .................. H04N 19/159 |
| 2021/0105465 | A1* | 4/2021 | Choi .................... H04N 19/176 |

FOREIGN PATENT DOCUMENTS

| | | |
|---|---|---|
| CN | 104935941 A | 9/2015 |
| CN | 108293112 A | 7/2018 |
| TW | 201820868 A | 6/2018 |
| WO | 2017/091759 A1 | 6/2017 |

OTHER PUBLICATIONS

Bing, B.; "H.265/HEVC Standard;" Next-Generation Video Coding and Streaming; Dec. 2015; pp. 115-164.

Chinese language office action dated Sep. 4, 2020, issued in application No. TW 108130963.

Extended European Search Report dated May 9, 2022, issued in application No. EP 19856224.1.

Choi, N., et al.; "CE3.3 related: Intra 67 modes coding with 3MPM;" Joint Video Experts Team (JVET) of ITU-T SG 16 WP 3 and ISO/IEC JTC 1/SC 29/WG 11; Jul. 2018; pp. 1-7.

Sarwer, M., et al.; "CE3-related: Intra mode coding;" Joint Video Experts Team (JVET) of ITU-T SG 16 WP 3 and ISO/IEC JTC 1/SC 29/WG 11; Jul. 2018; pp. 1-8.

Chen, J., et al.; "Algorithm description of Joint Exploration Test Model 7 (JEM7);" Joint Video Exploration Team (JVET) of ITU-T SG 16 WP 3 and ISO/IEC JTC 1/SC 29/WG 11; Jul. 2017; pp. 1-48.

Kumakura, T., et al.; "Fixing the number of mpm candidates;" Joint Collaborative Team on Video Coding (JCT-VC) of ITU-T SG 16 WP 3 and ISO/IEC JTC 1/SC 29/WG 11; Jul. 2011; pp. 1-8.

Wang, B., et al.; "CE3-related: A unified MPM list for intra mode coding;" Joint Video Experts Team (JVET) of ITU-T SG 16 WP 3 and ISO/IEC JTC 1/SC 29/WG 11; Mar. 2019; pp. 1-3.

Chinese language office action dated Nov. 8, 2022, issued in application No. CN 201980054913.2.

* cited by examiner

METHOD AND APPARATUS OF INTRA PREDICTION WITH MPM GENERATION IN IMAGE AND VIDEO PROCESSING

CROSS REFERENCE TO RELATED APPLICATIONS

The present invention claims priority to U.S. Provisional Patent Application, Ser. No. 62/725,299, filed on Aug. 31, 2018, entitled "The Simplified MPM Generation of Intra Mode Coding of Video Coding". The U.S. Provisional Patent Application is hereby incorporated by reference in its entirety.

FIELD OF THE INVENTION

The present invention relates to intra prediction in image and video processing. In particular, the present invention relates to construction of a Most Probable Mode (MPM) list for each block coded in intra prediction.

BACKGROUND AND RELATED ART

Intra prediction has been widely adopted in various image and video coding standards to process an initial picture or to periodically insert Intra coded picture (I-picture) or Intra coded blocks (I-blocks) for random access or for alleviation of error propagation. Intra prediction is usually designed to exploit spatial features in the image or video picture such as smooth area, vertical line or edge, horizontal line or edge, and diagonal line or edge. Intra prediction is also useful for regions with high motion or scene changes as intra prediction is more efficient than inter prediction for coding these regions. Intra prediction exploits the spatial correlation within a picture or within a picture region. For a block-based video coding standard, intra prediction for a current block is relied upon pixels in neighboring blocks that have been processed. For example, if blocks in a picture or picture region are sequentially processed row by row from top to bottom and from left to right, neighboring blocks on the top and neighboring blocks on the left of the current block can be used to form an intra predictor for pixels inside the current block.

The High-Efficiency Video Coding (HEVC) standard supports 35 intra prediction modes including 33 angular modes, DC mode, and Planar mode. FIG. 1 illustrates the prediction directions for the 33 angular intra prediction modes of the HEVC standard, where H represents Horizontal direction mode and V represents Vertical direction mode. An intra predictor for a current block coded or to be coded by intra prediction of the HEVC standard is generated by three steps including intra smoothing filter, intra prediction, and intra gradient filter. FIG. 2 illustrates exemplary reference samples filtered by an intra smoothing filter for deriving an intra predictor for a current block. A smoothing operation is applied to reference samples 22 of the current block 20 before calculating the intra predictor for the current block 20. The smoothing operation reduces the discontinuities introduced by some of the intra prediction modes by applying the intra smoothing filter to the reference samples 22 in a left neighboring column and an above neighboring row of the current block 20. This smoothing operation is adaptively applied depending on an intra prediction mode and the size of the current block.

The second step is to derive the intra predictor from neighboring reference samples according to one intra prediction mode selected from the 35 intra prediction modes supported by the HEVC standard. If an angular mode is selected, the value of each sample in the current block is predicted by extrapolating the samples from the reference samples according to the prediction direction of the selected angular mode. The value of each sample in the current block is calculated assuming an amplitude surface with a horizontal and vertical smooth gradient derived from the boundaries samples of the neighboring blocks if Planar mode is selected. The value of each sample of the current block is an average of the reference samples if DC mode is selected.

An intra gradient filter is applied to samples at the left and top boundaries of the current block in the third step if the intra prediction mode is DC, Horizontal, or Vertical mode. The concept of applying the intra gradient filter is to utilize the gradient information along the intra prediction direction to improve the quality of the intra predictor. The samples in the first row and first column of the current block are filtered by the intra gradient filter when the selected intra prediction mode is DC mode. The samples in the first row are filtered by the intra gradient filter when the selected intra prediction mode is Horizontal mode, and the samples in the first column are filtered by the intra gradient filter if the selected intra prediction mode is Vertical mode.

The selected intra prediction mode is signaled explicitly or inferred from previously decoded modes of the above and left neighboring blocks of the current block. The intra prediction modes of the two neighboring blocks are included in a set of three Most Probable Modes (MPMs). A first MPM flag is signaled to indicate whether the selected mode is identical to one of the three MPMs, if so, a MPM index is sent to indicate which of the three MPMs is selected; if the first MPM flag is false, the selected mode is explicitly signaled using a 5-bit fixed length codeword.

The 33 angular modes shown in FIG. 1 can be expanded to a general case with more or less angular modes, where each of the angular modes can be represented by mode H+k or mode V+k, where H represents the direction of Horizontal mode, V represents the direction of Vertical mode, and k=0, +−1, +−2, . . . +−K. An example of 65 angular modes for intra prediction is shown in FIG. 3, where k is ranged from −16 to 16, and mode H−16 and mode V−16 are the same mode as this mode refers to the prediction direction from an upper-left corner to the center of the current block. FIG. 3 illustrates the 65 angular intra prediction modes with additional 32 angular modes in between the original 33 angular modes supported by the HEVC standard as shown in FIG. 1. The 65 angular modes in FIG. 3 include modes H+16 to H−15 from bottom to top at the left boundary of the block and modes V−16 to V+16 from left to right at the upper boundary of the block.

In the up-coming video coding standard Versatile Video Coding (VVC), two test models, VVC Test Model (VTM) and the Benchmark Set (BMS) were created during the development of VVC standard. VTM was the reference software for VVC which includes a minimal set of coding tools, whereas the BMS software was created for additional testing of various tools in a framework that is more feature-rich than VTM. There are a total of 67 intra prediction modes used in the BMS test model as comparing to a total of 35 intra prediction modes available in the VTM test model. The 67 intra prediction modes of the BMS test model include 65 angular modes as shown in FIG. 3, DC mode, and Planar mode. In the BMS test model, a list of 6 MPMs is generated from intra prediction modes of neighboring blocks, and truncated unary coding is used to code a current intra prediction mode if it is one of the modes in the MPM list. Either fixed length coding or truncated binarization coding is used to code a current intra prediction mode if it does not belong to any mode in the MPM list.

In the VTM test model of the up-coming video coding standard, the selected intra prediction mode is signaled explicitly or inferred from previously decoded modes of the above and left neighboring blocks of the current block. The intra prediction modes of the two neighboring blocks are included in a set of three Most Probable Modes (MPMs). A first MPM flag is signaled to indicate whether the selected mode is identical to one of the MPMs, if so, intra mode information, including a MPM index, is sent to indicate which of the MPMs is selected; if the first MPM flag is false, the selected mode is explicitly signaled using truncated binary codeword.

The 6 MPMs in the MPM list are classified into three categories in the BMS test model, the first category includes neighboring intra modes, the second category includes derived intra modes, and the third category includes default intra modes. FIG. 4 illustrates five neighboring blocks of a current block for constructing a MPM list of the current block. Intra prediction modes of these five neighboring blocks are used to form an initial MPM list of the current block 40, where the locations of the five neighboring blocks are left (L) 44, above (A) 42, below-left (BL) 45, above-right (AR) 43, and above-left (AL) 41 as shown in FIG. 4. The initial MPM list is formed by inserting the 5 intra prediction modes of the neighboring blocks, Planar mode, and DC mode. A pruning process is applied to remove duplicated modes to leave unique modes in the MPM list. The order of the intra prediction modes in the initial MPM list according to the BMS test model are: left, above, Planar, DC, below-left, above-right, and then above-left.

Derived modes are added to the MPM list if there are less than 6 MPM candidates in the MPM list after the pruning process. One or more derived modes are obtained by adding +1 or −1 to one or more angular modes already existed in the MPM list. The derived modes cannot be generated from non-angular modes such as DC and Planar modes.

If the MPM list is still not full, that is there are still less than 6 MPM candidates in the MPM list after adding one or more derived modes, one or more default modes are added in the following order: vertical, horizontal, mode 2, and diagonal mode. Beside the 6 MPM candidates included in the MPM list, remaining 61 modes are non-MPM modes. These 61 non-MPM modes are first divided into two sets: a selected mode set and a non-selected mode set. The selected mode set contains 16 intra prediction modes and the remaining 45 intra prediction modes are assigned to the non-selected mode set. A flag is first signaled to indicate whether a current intra prediction mode belongs to the selected mode set or a non-selected mode set. The current intra prediction mode is coded by a 4-bit fixed-length code if the flag indicates the current intra prediction mode is in the selected mode set, else the current intra prediction mode is coded by a truncated binary code. The selected mode set is generated by sub-sampling the 61 remaining modes, which includes {0, 4, 8, 12, 16, 20, . . . 60}, and the non-selected mode set consists of the remaining 45 modes {1, 2, 3, 5, 5, 7, 9, 10, . . . 59}.

BRIEF SUMMARY OF THE INVENTION

A method and apparatus for processing image or video data by intra prediction in an image or video coding system are disclosed. Embodiments of an image or video coding system receive input data associated with a current block in a current picture coded or to be coded by intra prediction. A Most Probable Mode (MPM) list with a number of MPMs is derived for the current block, where Planar mode is selected as the first MPM in the MPM list for blocks coded or to be coded by intra prediction. Remaining intra prediction modes not included in the MPM list are set as non-MPMs. The image or video coding system encodes or decodes the current block according to a current intra prediction mode. The current intra prediction mode is belonging to one of the MPMs in the MPM list or one of the non-MPMs.

In an embodiment, the number of MPMs in the MPM list is 6 and the number of non-MPMs is 61 as the current intra prediction mode is one of 67 intra prediction mode. The number of MPMs in the MPM list is a variable selecting from 1 to a maximum number of available intra prediction modes according to an exemplary embodiment of the present invention.

Some embodiments of MPM list derivation further comprise determining a number of available angular modes of an above neighboring block and a left neighboring block of the current block, and selecting one or more other MPMs to be inserted in the MPM list according to the number of available angular modes. In an exemplary embodiment, the top neighboring block is located above an upper-right corner pixel of the current block and the left neighboring block is located beside a below-left corner pixel of the current block. In a case when the number of available angular modes is 0, the MPM list further includes DC mode, Horizontal mode, and Vertical mode. In cases when the number of available angular modes is 1 or 2, one or a combination of DC mode and multiple angular modes derived from the available angular mode(s) are inserted in the MPM list. In one example, the angular modes derived from the available angular mode(s) are two adjacent modes of the available angular mode(s). For example, when the number of available angular mode is 1, the MPM list includes Planar mode and one or a combination of DC mode, Horizontal mode, Vertical mode, and two angular modes derived from the available angular mode. When the number of available angular mode is 2, the MPM list includes Planar mode and one or a combination of DC mode, and angular modes derived from at least one of the two available angular modes. In a specific embodiment, the MPM list includes an above mode of the above neighboring block and a left mode of the left neighboring block, and the above mode and the left mode are conditionally swapped in the MPM list. For example, the positions of the above mode and the left mode are swapped when the above mode satisfies a given condition.

An embodiment of deriving a MPM list further comprises determining if an above neighboring block is located in a same Coding Tree Unit (CTU) as the current block, and restricts accessing an intra prediction mode of the above neighboring block during MPM list generation if the above neighboring block and the current block are not located in the same CTU. An embodiment restricts accessing an intra prediction mode of the left neighboring block during MPM list generation if the left neighboring block and the current block are not located in a same slice.

One or more bins are used to signal the current intra prediction mode if the current intra prediction mode belongs to one of the MPMs in the MPM list, and a first bin used to signal the current intra prediction mode is context coded. One or more bins except for the first bin used to signal the current intra prediction mode are bypass coded when the current intra prediction mode is one of the MPMs. In one embodiment, only a first bin in the one or more bins used to signal the current intra prediction mode is context coded when the current intra prediction mode is one of the MPMs. Truncated unary coding or fixed length coding may be used to signal the current intra prediction mode if the current intra prediction mode belongs to one of the non-MPMs.

Aspects of the disclosure further provide an apparatus in the image or video coding system for compression image or video data by intra prediction. Embodiments of the apparatus derive a MPM list for a current block coded or to be coded by intra prediction, and Planar mode is inserted as the first MPM in the MPM list for blocks coded or to be coded by intra prediction.

Aspects of the disclosure further provide a non-transitory computer readable medium storing program instructions for causing a processing circuit of an apparatus to perform an intra prediction method for image or video processing. An embodiment of the intra prediction method derives a MPM list for encoding or decoding a current block, and Planar mode is included as the first MPM in the MPM list for blocks coded or to be coded by intra prediction. Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Figure 7:
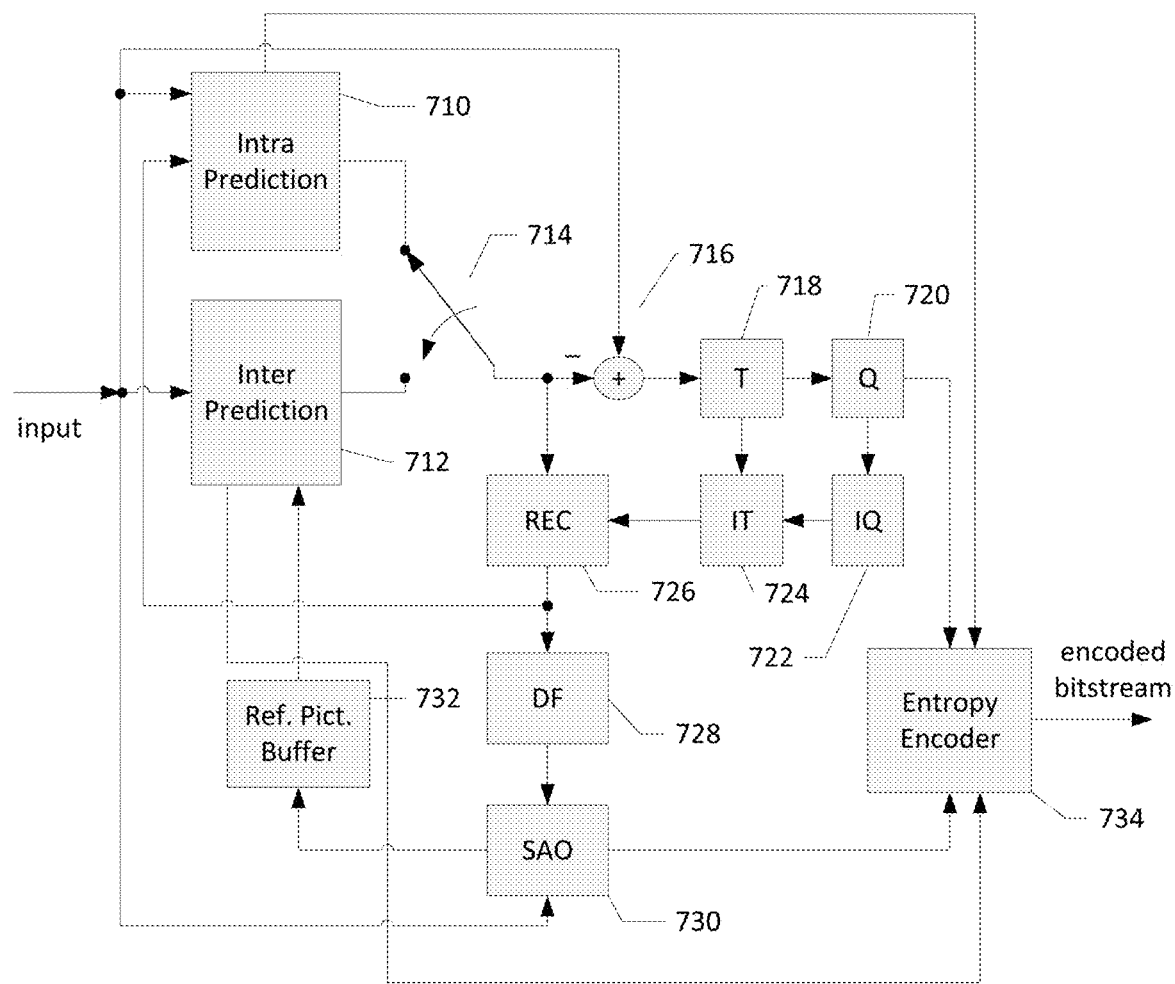
FIG. 7 illustrates an exemplary system block diagram for a video encoding system incorporating the intra prediction method according to embodiments of the present invention.
Figure 8:
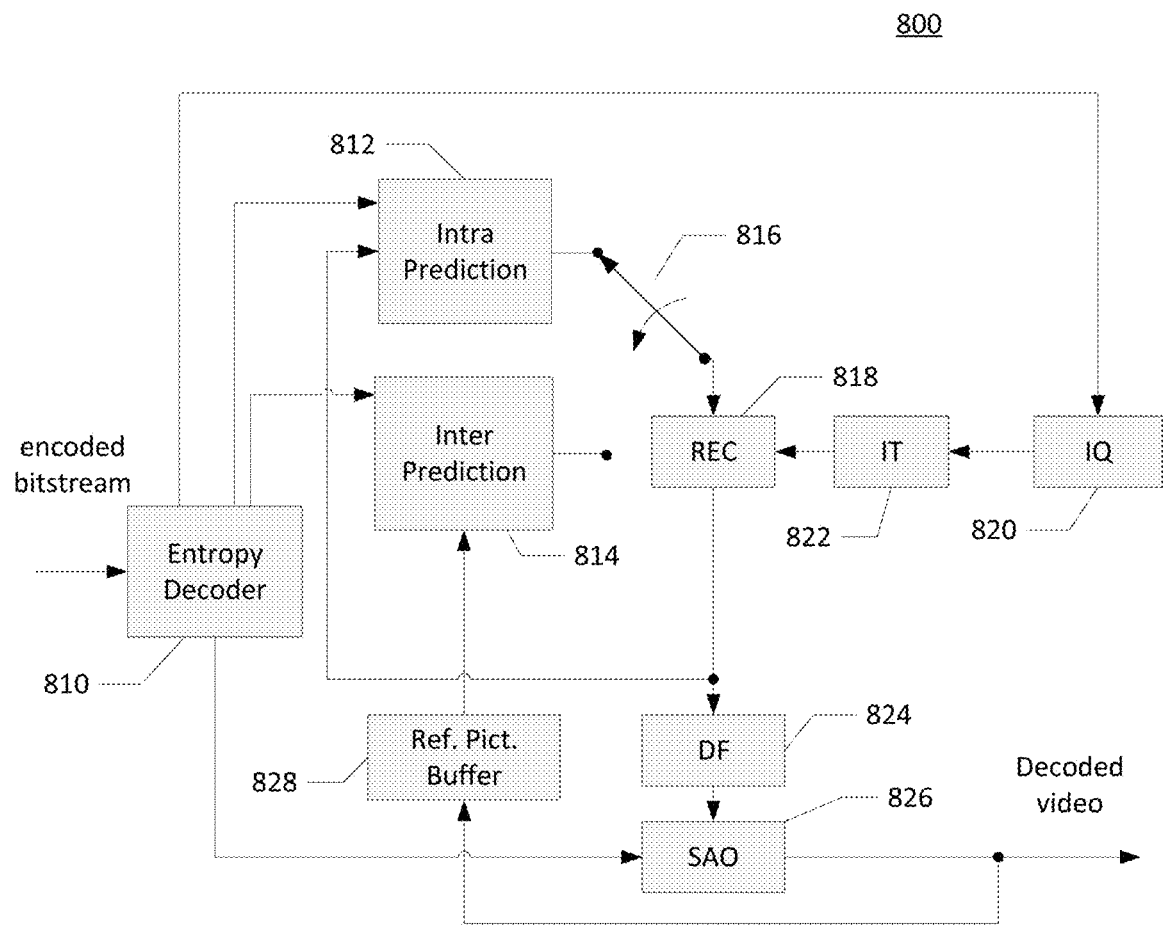
FIG. 8 illustrates an exemplary system block diagram for a video decoding system incorporating the intra prediction method according to embodiments of the present invention.

In this disclosure, the present application describes various intra prediction methods for improving the coding efficiency of processing image or video blocks coded in intra prediction. Each or a combination of the intra prediction methods may be implemented in a video encoder or video decoder. An exemplary video encoder and decoder implementing one or a combination of the methods are illustrated in FIG. 7 and FIG. 8 respectively. Systems and methods described herein are organized in sections as follows. The section "Variable Number of MPMs" demonstrates exemplary methods of adaptively determining a number of MPMs for encoding or decoding intra coded blocks. The section "MPM List Generation" describes exemplary methods of deriving MPMs to be inserted in a MPM list. The section "Constraint in MPM List Generation" describes exemplary embodiments of MPM list generation with a constraint of accessing information of one or more neighboring blocks. The section "MPM and non-MPM signaling" demonstrates some embodiments of binarization and signaling of MPMs and non-MPMs. The section "Representative Flowcharts of Exemplary Embodiments" describes exemplary image or video processing methods utilizing a representative flowchart. The section "Video Encoder and Decoder Implementation" together with FIG. 7 and FIG. 8 illustrate a video encoding system and a video decoding system incorporating one or a combination of the described image or video processing methods.

Variable Number of MPMs In some embodiments of classifying N intra prediction modes into M MPMs and (N−M) non-MPMs, M is a variable value which can be varied from 1 to a maximum number of available intra prediction modes. The maximum number of available intra prediction modes may be predefined, implicitly derived, or explicitly signaled. In one embodiment, the total number of intra prediction modes N is 67 and the number of MPMs M is 6, so the number of non-MPMs (N−M) is 61. In another embodiment, the total number of intra prediction modes N is 67 and the number of MPMs M is 5, so the number of non-MPMs (N−M) is 62. The number of MPMs M may be adaptively determined by the encoder and the decoder according to some exemplary embodiments. For example, the number of MPMs M for a current block is determined by explicitly signaling or the number of MPMs M is implicitly derived for the current block.

Figure 1:
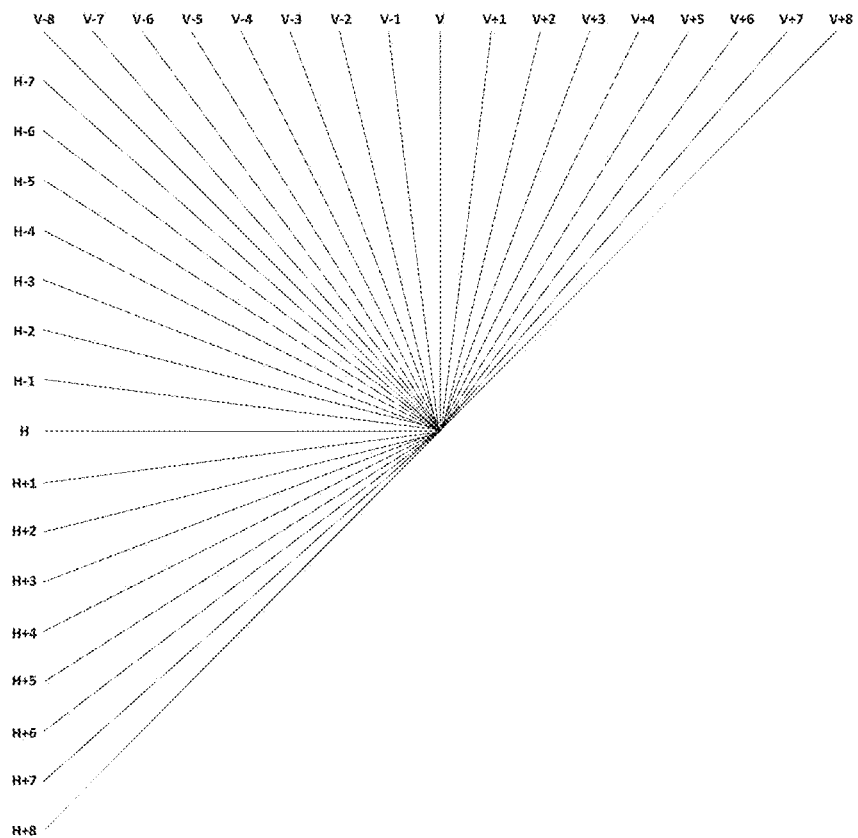
FIG. 1 illustrates 33 angular intra prediction modes supported in the HEVC standard.
Figure 2:
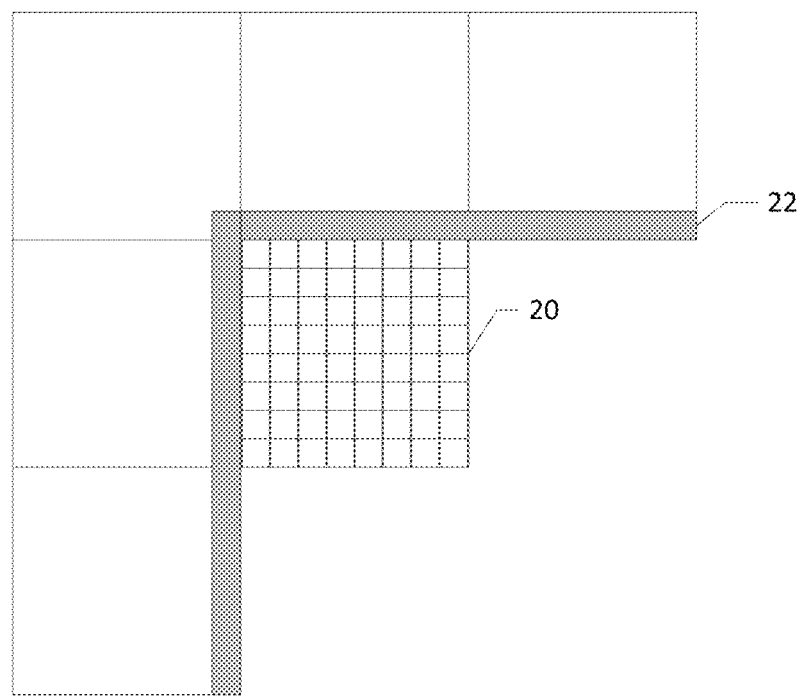
FIG. 2 illustrates exemplary reference samples filtered by an intra smoothing filter for deriving an intra predictor for a current block.
Figure 3:
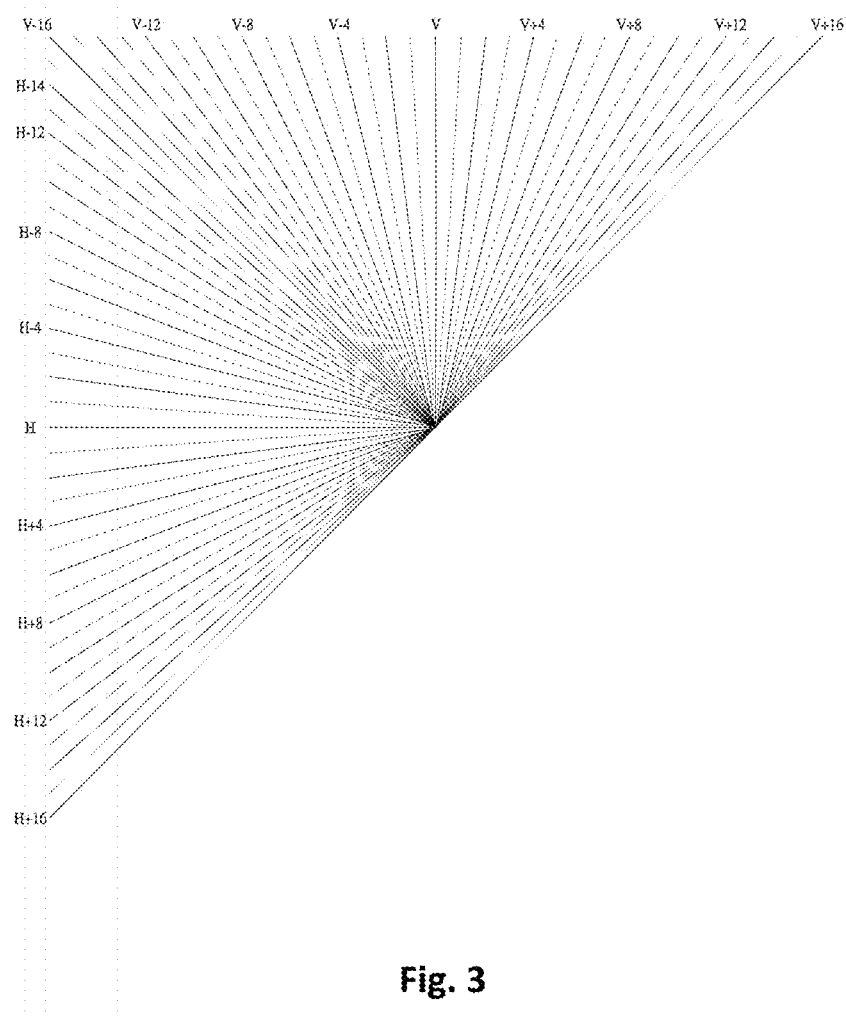
FIG. 3 illustrates an example of 65 angular intra prediction modes.
Figure 4:
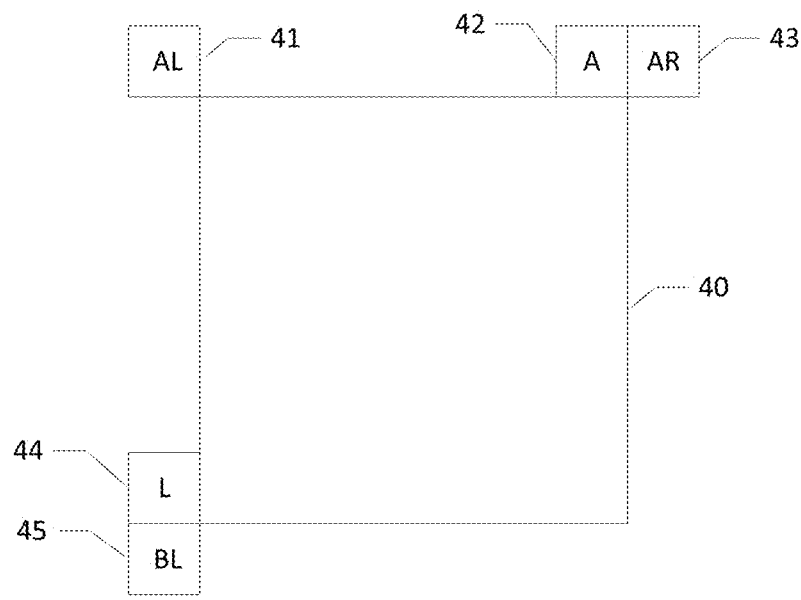
FIG. 4 illustrates five neighboring blocks used to derive an initial MPM list of a current block according to the BMS test model.
Figure 5:
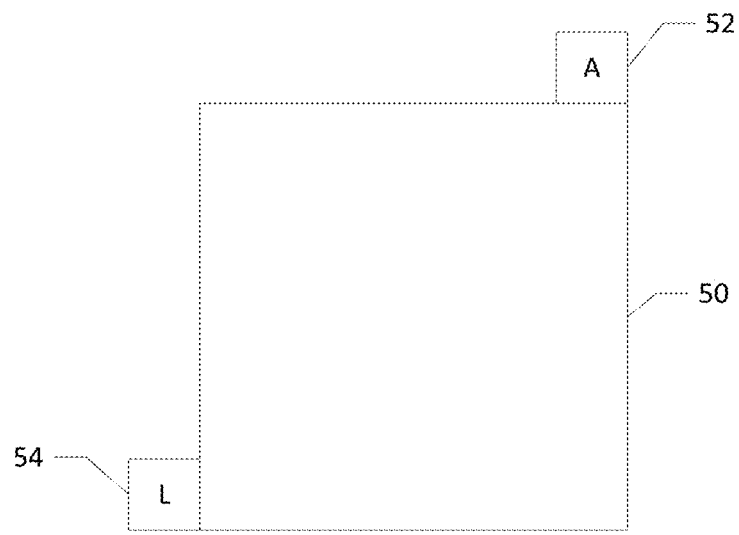
FIG. 5 illustrates an above neighboring block and a left neighboring block of a current block used to derive a MPM list of the current block according to some exemplary embodiments of the present invention.

MPM List Generation In some embodiments of MPM list generation, a MPM list for a current block is generated from neighboring mode(s) of one or more neighboring blocks of the current block. FIG. 5 illustrates an example of the locations of two neighboring blocks of a current block 50, where the two neighboring block includes an above neighboring block 52 and a left neighboring block 54. An above mode of the above neighboring block 52 and a left mode of the left neighboring block 54 are used to generate a MPM list for the current block 50. The above mode or the left mode is an angular mode, non-angular mode, or it is unavailable. For example, the above mode is unavailable if the above neighboring block 52 is not coded in intra prediction, or the above mode is unavailable if the above neighboring block is not located in the same CTU as the current block. Examples of the non-angular mode are DC mode and Planar mode defined in the HEVC standard. Examples of the angular modes are the 33 modes with different angles defined in FIG. 1 or the 64 modes with different angles defined in FIG. 3, which include Horizontal mode and Vertical mode.

Various embodiments of the MPM list derivation depend on the number of available angular modes of the neighboring blocks used to derive the MPM list. For example, the neighboring blocks include the above neighboring block 52 and the left neighboring block 54 as shown in FIG. 5. A total number of available angular modes of the neighboring blocks is $N_{ang}$, and in this example, the value of $N_{ang}$ varies from 0 to 2 as there are only two neighboring blocks used to derive the MPM list. Three different cases for MPM list generation are defined according to the value of $N_{ang}$, where case 0 is for $N_{ang}=0$, case 1 is for $N_{ang}=1$, and case 2 is for $N_{ang}=2$. In some embodiments, regardless the value of $N_{ang}$, Planar mode is always inserted in the first position of the MPM list, in other words, Planar mode is the first MPM in the MPM list for all blocks coded or to be coded in intra prediction. In another embodiment, regardless the value of $N_{ang}$, at least one of Planar mode and DC mode are always inserted into the MPM list. In another embodiment, regardless the value of $N_{ang}$, both planar and DC mode are always inserted into the MPM list. In yet another embodiment, regardless the value of $N_{ang}$, DC mode is inserted into the MPM list after planar mode if DC mode is inserted. One or more remaining MPMs in the MPM list are derived according to the value of $N_{ang}$.

In case 0, as none of the neighboring modes is angular mode, beside Planar mode, the MPM list further includes one or more modes from DC mode, Horizontal mode, and Vertical mode. Any order can be used. For example, when $N_{ang}$ is 0 and the number of MPMs in the MPM list is 6, the MPM list includes MPMs in the following order {Planar mode, DC mode, Vertical mode, Horizontal mode, Mode 2, Diagonal mode}. In another example, the MPM list includes at least 4 MPMs in the following order {Planar mode, DC mode, Vertical mode, Horizontal mode} when $N_{ang}$ is 0. Other modes can be inserted into any positions in that other. The order of Vertical mode and Horizontal mode can be exchanged. In another example, the MPM list includes {Planar mode, DC mode, Vertical mode, Horizontal mode, one of Horizontal mode and Vertical mode added with an offset1, one of Horizontal mode and Vertical mode added with an offset2}, where offset1 and offset2 can be ±1, ±2, ±3, or ±4. The order of Vertical mode and Horizontal mode can be exchanged. In another example, at least one of Planar mode and DC mode are always inserted into the MPM list. In another example, both Planar mode and DC mode are always inserted into the MPM list. In another example, DC mode is inserted into the MPM list after Planar mode.

In case 1, one of the neighboring modes is an angular mode, and this available angular mode is denoted as $Mode_{ang}$. For example, a mode of an above neighboring block is an angular mode while a mode of a left neighboring block is a non-angular mode or is unavailable. The MPM list includes Planar mode and one or a combination of DC mode, and one or more angular modes derived from $Mode_{ang}$ when the number of available angular modes is 1 ($N_{ang}=1$). Any order can be used. For example, the MPM list includes 6 MPMs in the following order {Planar mode, DC mode, first angular mode, second angular mode, Horizontal mode, Vertical mode}. The order of Vertical mode and Horizontal mode can be exchanged. The first angular mode and the second angular mode are two angular modes derived from the available angular mode $Mode_{ang}$. In one example, the first angular mode and the second angular mode are two adjacent modes of the available mode $Mode_{ang}$. In another example, one of the first and the second angular modes is the available angular mode $Mode_{ang}$.

In case 1, one of the neighboring modes is an angular mode, and this available angular mode is denoted as $Mode_{ang}$. For example, a mode of an above neighboring block is an angular mode while a mode of a left neighboring block is a non-angular mode or is unavailable. In some embodiments, the MPM list includes at least one of Planar mode and DC mode, and one or a combination of $Mode_{ang}$, and one or more angular modes derived from $Mode_{ang}$ when the number of available angular modes is 1 ($N_{ang}=1$). Any order can be used. In one example, the MPM list includes at least 4 MPMs in the following order {Planar mode, $Mode_{ang}$, first angular mode, second angular mode}. The first angular mode and the second angular mode are two angular modes derived from the available angular mode $Mode_{ang}$. In one example, the first angular mode and the second angular mode are two adjacent modes of the available mode $Mode_{ang}$.

In another example, the MPM list includes 6 MPMs in the following order {Planar mode, $Mode_{ang}$, first angular mode, second angular mode, third angular mode, fourth angular mode}. The first angular mode, second angular mode, third angular mode, and fourth angular mode are angular modes derived from the available angular mode $Mode_{ang}$. In one example, the first angular mode and the second angular mode are two adjacent modes of the available mode $Mode_{ang}$. In one example, the third angular mode and the fourth angular mode are the available mode $Mode_{ang}$ added with an offset, where the offset can be ±1, ±2, ±3, or ±4.

In case 2, two neighboring modes of the neighboring blocks are angular modes, denoted as $Mode_{ang1}$ and $Mode_{ang2}$. For example, the mode of a left neighboring block is $Mode_{ang1}$ and the mode of an above neighboring block is $Mode_{ang2}$. In some embodiments, the MPM list includes at least one of Planar mode and DC mode, and multiple angular modes derived from one or both the available angular modes $Mode_{ang1}$ and $Mode_{ang2}$. Any order can be used. In some embodiments, the MPM list only includes one or more angular modes derived from one of the available angular modes if the two available angular modes $Mode_{ang1}$ and $Mode_{ang2}$ are the same, and the MPM list includes multiple angular modes derived from both of the two available angular modes if the two available angular modes $Mode_{ang1}$ and $Mode_{ang2}$ are different. For example, the following modes are inserted in the MPM list when $N_{ang}$ is 2: {Planar mode, DC mode, first angular mode, second angular mode, third angular mode, fourth angular mode}. In an example, the first and second angular modes are two adjacent modes of $Mode_{ang1}$, and the third and fourth angular modes are two adjacent modes of $Mode_{ang2}$. In another example, one of the first and second angular modes is $Mode_{ang1}$ and one of the third and fourth angular modes is $Mode_{ang2}$. In another example, one of the first and second angular modes is $Mode_{ang1}$ and another one of the first and second angular modes is $Mode_{ang2}$. The order of MPMs in a MPM list may be altered after the MPM list is generated, for example, at least one angular mode derived from the above mode and at least one angular mode derived from the left mode may be swapped under one or more given conditions. The encoder or decoder checks one or more given conditions to determine whether swapping of the MPM order in the MPM list is required. In an embodiment of MPM swapping after construction of a MPM list, swapping of one or more angular modes associated with the above mode and one or more angular modes associated with the left mode is performed if the mode number of the above mode is greater than or equal to 40. For example, the default MPM list is {Planar mode, DC mode, Above mode, Left mode, first angular mode, second angular mode} when both the above mode of the above neighboring block and the left mode of the left neighboring block are all angular mode. The first and second angular modes may be derived from the above mode and/or the left mode. If the given condition is met, the MPM list becomes {Planar mode, DC mode, Left mode, Above mode, first angular mode, second angular mode}.

Constraint in MPM List Generation To generate a MPM list according to the intra prediction mode of at least a neighboring block, the video encoder or decoder requires accessing the intra prediction mode of the one or more neighboring blocks from the memory buffer. For example, an above mode of the above neighboring block 52 and a left mode of the left neighboring block 54 as shown in FIG. 5 are stored in a line buffer after processing the above neighboring block 52 and the left neighboring block 54 respectively. The above mode and left mode are retrieved from the memory buffer when the video encoder or decoder is generating a MPM list for the current block 50. The MPM list generation process requires the video encoder or decoder to store the above modes of the entire picture line in the memory buffer. In order to reduce the memory buffer required for MPM list generation, some embodiments of the present invention restrict accessing the intra prediction mode of the above block, the left block, or both the above and left blocks according to a constraint. In an embodiment, when generating a MPM list for a current block, accessing the above mode of an above neighboring block is only allowed if the above neighboring block is located in the same Coding Tree Unit (CTU) as the current block. In another embodiment, the constraint restricts accessing the above mode if the above neighboring block is located in a different slice as the current slice. In some embodiments, accessing the left mode of a left neighboring block is only allowed if the left neighboring block is located in the same CTU or the same slice as the current block. In another embodiment, accessing the above mode or the left mode is restricted if the above neighboring block or the left neighboring block is in a different CTU row as the current block. These embodiments of constraint in MPM list generation can be implemented individually or in conjunction. The above mode or the left mode is treated as unavailable if accessing information associated with the corresponding neighboring block is not allowed. In one embodiment, if the above mode or left mode is treated as unavailable as accessing from the corresponding neighboring block is not allowed, a default mode is used. For example, the default mode is one of Planar mode, DC mode, Horizontal mode, Vertical mode, Diagonal mode, Vertical Diagonal mode, and mode 2.

MPM and non-MPM Signaling In cases when a current intra prediction mode of a current block is belonging to one of the MPMs in the MPM list, as the same MPM list is derived on both the video encoder side and the video decoder side, the video bitstream only needs to contain information associated with an index of the selected MPM in the MPM list. In HEVC, a MPM flag and a MPM index are signaled in the video bitstream if the current prediction mode is one of the MPMs. The MPM flag is a one-bit (bin) flag indicating whether the current prediction mode is belonging to one of the MPMs in the MPM list. The MPM index is transmitted to indicate which MPM in the MPM list is selected when the MPM flag indicates the current intra prediction mode is one of the MPMs.

In some embodiments of the present invention, a first bin used to signal whether the current intra prediction mode is one of the MPMs or non-MPMs is context coded. Embodiments of MPM signaling comprise using one or more bins to select one MPM from six MPMs in the MPM list, and the first bin for MPM signaling is context coded. In a preferred embodiment, only the first bin for MPM signaling is context coded. One bin may be represented by one bit.

Table 1 shows an example of binarization of a MPM index for indicating the MPMs in a MPM list when the size of the MPM list is six. Table 2 shows another example of binarization of a MPM index for indicating one of the six MPMs in the MPM list. Table 3 shows an example of binarization of a MPM index for indicating one of the five MPMs in the MPM list.

TABLE 1

| MPM Index | Binarization |
| --- | --- |
| 0 | 1 |
| 1 | 0 1 |
| 2 | 0 0 1 |
| 3 | 0 0 0 1 |
| 4 | 0 0 0 0 1 |
| 5 | 0 0 0 0 0 |

TABLE 2

| MPM Index | Binarization |
| --- | --- |
| 0 | 1 |
| 1 | 0 1 |
| 2 | 0 0 0 0 |
| 3 | 0 0 0 1 |
| 4 | 0 0 1 0 |
| 5 | 0 0 1 1 |

TABLE 3

| MPM Index | Binarization |
| --- | --- |
| 0 | 1 |
| 1 | 0 1 |
| 2 | 0 0 1 |
| 3 | 0 0 0 1 |
| 4 | 0 0 0 0 |

In one embodiment of the present invention, only a first bin for MPM signaling is context coded, for example only the first bin of the binarization as shown in Table 1, 2 or 3 is context coded. In another embodiment, all the bins for MPM signaling are bypass coded so context coding is not used in MPM signaling. In yet another embodiment, one or more bins are context coded while another one or more bins are bypass coded in MPM signaling.

If the current intra prediction mode is belonging to one of the non-MPMs, fixed length coding is used to signal the current intra prediction mode according to an embodiment, or truncated unary coding is used to signal the current intra prediction mode according to another embodiment.

Figure 6:
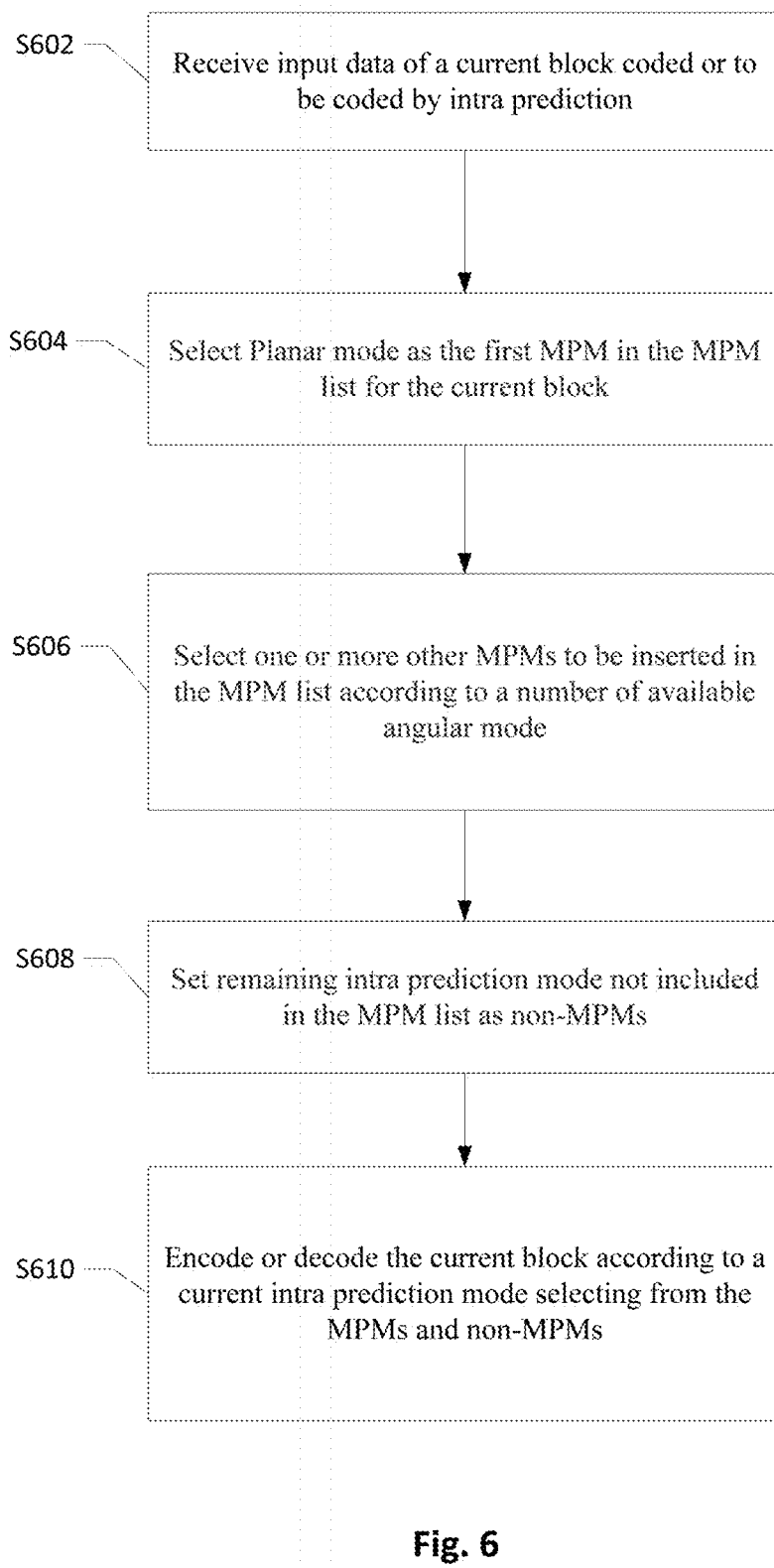
FIG. 6 is a flowchart illustrating an exemplary image or video processing method for encoding or decoding a current block coded or to be coded by intra prediction according to an embodiment of the present invention.

Representative Flowchart of Exemplary Embodiment FIG. 6 is a flowchart illustrating an exemplary method for processing a current block in a current picture by intra prediction according to an embodiment of the present invention. An image or video encoder or decoder receives input data associated with the current block coded or to be coded by intra prediction in step S602, and determines a Most Probable Mode (MPM) list for coding the current block in steps S604 and S606. In step S604, Planar mode is selected as the first MPM in the MPM list for the current block regardless a number of available angular modes of neighboring blocks. In step S606, one or more other MPMs are selected to be inserted in the MPM list according to the number of available angular modes of the neighboring blocks. For example, the neighboring blocks include an above neighboring block and a left neighboring block of the current block, and there are six MPMs in the MPM list. The encoder or decoder in step S608 sets remaining intra prediction modes not included in the MPM list as non-MPMs. For example, 61 remaining intra prediction modes are set as non-MPMs after constructing the MPM list with 6 MPMs as the total number of intra prediction modes is 67. In step S610, the encoder or decoder encodes or decodes the current block according to a current intra prediction mode selecting from the MPMs or non-MPMs. The current intra prediction mode is coded using one or more bins if the current intra prediction mode is belonging to one of the MPMs in the MPM list, and the first bin is context coded. In some embodiment, the current intra prediction mode is coded using fixed length coding or unary truncated coding if the current intra prediction mode is belonging to one of the non-MPMs.

Video Encoder and Decoder Implementations The foregoing proposed image or video processing methods can be implemented in video encoders or decoders. For example, a proposed image or video processing method is implemented in an intra prediction module of an encoder, and/or an intra prediction module of a decoder. Alternatively, any of the proposed methods is implemented as a circuit coupled to the intra prediction module of the encoder and/or the intra prediction module of the decoder, so as to provide information such as a MPM list needed by the intra prediction module.

FIG. 7 illustrates an exemplary system block diagram for a Video Encoder 700 implementing a video processing method of the present invention. Intra Prediction module 710 selects an intra prediction mode for a block to be coded in intra prediction, and provides an intra predictor based on reconstructed video data of a current picture and the intra prediction mode according to various embodiments of the present invention. In an embodiment, the encoding method comprises deriving multiple MPMs to be included in a MPM list for the block, and Planar mode is always selected as the first MPM in the MPM list. The remaining intra prediction modes not included in the MPM list is set as non-MPMs. Inter Prediction module 712 performs motion estimation (ME) and motion compensation (MC) to provide predictors based on video data from other picture or pictures. For each block, either Intra Prediction module 710 or Inter Prediction module 712 supplies the selected predictor to Adder 716 to form prediction errors, also called prediction residues.

The prediction residues of the current block are further processed by Transformation module (T) 718 followed by Quantization module (Q) 720. The transformed and quantized residual signal is then encoded by Entropy Encoder 734 to form an encoded video bitstream. The encoded video bitstream is then packed with side information. The transformed and quantized residual signal of the current block is processed by Inverse Quantization module (IQ) 722 and Inverse Transformation module (IT) 724 to recover the prediction residues. As shown in FIG. 7, the prediction residues are recovered by adding back to the selected predictor at Reconstruction module (REC) 726 to produce reconstructed video data. The reconstructed video data may be stored in Reference Picture Buffer (Ref. Pict. Buffer) 732 and used for prediction of other pictures. The reconstructed video data from REC 726 may be subject to various impairments due to the encoding processing, consequently, in-loop processing Deblocking Filter (DF) 728 and Sample Adaptive Offset (SAO) 730 are applied to the reconstructed video data before storing in the Reference Picture Buffer 732 to further enhance picture quality. Syntax associated with information for the in-loop processing DF 728 and SAO 730 are provided to Entropy Encoder 734 for incorporation into the encoded video bitstream.

An exemplary corresponding Video Decoder 800 for decoding data encoded by Video Encoder 700 of FIG. 7 is shown in FIG. 8. The encoded video bitstream is the input to Video Decoder 800 and is decoded by Entropy Decoder 810 to parse and recover the transformed and quantized residual signal and other system information. The decoding process of Decoder 800 is similar to the reconstruction loop at Encoder 700, except Decoder 800 only requires motion compensation prediction in Inter Prediction module 814. Each block is decoded by either Intra Prediction module 812 or Inter Prediction module 814. Switch 816 selects an intra predictor from Intra Prediction module 812 or Inter predictor from Inter Prediction module 814 according to decoded mode information. Intra Prediction module 812 decodes a current intra prediction mode for a current block coded in intra prediction according to an embodiment of the present invention. Intra Prediction module 812 derives multiple MPMs to be included in a MPM list for the current block, and Planar mode is inserted as the first MPM in the MPM list. The transformed and quantized residual signal associated with each block is recovered by Inverse Quantization module (IQ) 820 and Inverse Transformation module (IT) 822. The recovered transformed and quantized residual signal is reconstructed by adding back the predictor in REC 818 to produce reconstructed video. The reconstructed video is further processed by DF 824 and SAO 826 to generate final decoded video. If the currently decoded picture is a reference picture, the reconstructed video of the currently decoded picture is also stored in Ref. Pict. Buffer 828 for later pictures in decoding order.

Various components of Video Encoder 700 and Video Decoder 800 in FIG. 7 and FIG. 8 may be implemented by hardware components, one or more processors configured to execute program instructions stored in a memory, or a combination of hardware and processor. For example, a processor executes program instructions to control receiving of input data associated with a current picture. The processor is equipped with a single or multiple processing cores. In some examples, the processor executes program instructions to perform functions in some components in Encoder 700 and Decoder 800, and the memory electrically coupled with the processor is used to store the program instructions, information corresponding to the reconstructed images of blocks, and/or intermediate data during the encoding or decoding process. The memory in some embodiment includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable medium listed above. As shown in FIG. 7 and FIG. 8, Encoder 700 and Decoder 800 may be implemented in the same electronic device, so various functional components of Encoder 700 and Decoder 800 may be shared or reused if implemented in the same electronic device. For example, one or more of Reconstruction module 726, Inverse Transformation module 724, Inverse Quantization module 722, Deblocking Filter 728, Sample Adaptive Offset 730, and Reference Picture Buffer 732 in FIG. 7 may also be used to function as Reconstruction module 818, Inverse Transformation module 822, Inverse Quantization module 820, Deblocking Filter 824, Sample Adaptive Offset 826, and Reference Picture Buffer 828 in FIG. 8, respectively.

Embodiments of the intra prediction method for image or video coding system may be implemented in a circuit integrated into a video compression chip or program code integrated into video compression software to perform the processing described above. For examples, MPM derivation for a current block coded or to be coded in intra prediction may be realized in program code to be executed on a computer processor, a Digital Signal Processor (DSP), a microprocessor, or field programmable gate array (FPGA). These processors can be configured to perform particular tasks according to the invention, by executing machine-readable software code or firmware code that defines the particular methods embodied by the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of processing image or video data by intra prediction in an image or video coding system, comprising:
   receiving input data associated with a current block in a current picture, wherein the current block is coded or to be coded by intra prediction;
   deriving a plurality of Most Probable Modes (MPMs) for the current block wherein deriving a plurality of MPMs further comprises determining a number of available angular modes of an above neighboring block and a left neighboring block of the current block, and selecting one or more modes to be inserted in the MPMs according to the number of available angular modes, wherein DC mode, Horizontal mode, and Vertical mode are inserted in the MPMs if the number of available angular modes is 0; and
   encoding or decoding the current block according to a current intra prediction mode, wherein the current intra prediction mode is belonging to one of the MPMs.

2. The method of claim 1, wherein the current intra prediction mode is one of 67 intra prediction modes, and the MPMs include 6 MPMs selected from the 67 intra prediction modes.

3. The method of claim 1, wherein a number of MPMs is a variable selecting from 1 to a maximum number of available intra prediction modes.

4. The method of claim 1, wherein the top neighboring block is located above an upper-right corner pixel of the current block and the left neighboring block is located beside a below-left corner pixel of the current block.

5. The method of claim 1, wherein one or a combination of DC mode and a plurality of angular modes derived from the available angular mode(s) are inserted in the MPMs if the number of available angular modes is 1 or 2.

6. The method of claim 5, wherein the plurality of angular modes derived from the available angular mode(s) includes two adjacent modes of the available angular mode(s).

7. The method of claim 5, wherein one or a combination of DC mode, Horizontal mode, Vertical mode, and two angular modes derived from the available angular mode are inserted in the MPMs if the number of available angular modes is 1.

8. The method of claim 5, wherein one or a combination of DC mode and angular modes derived from at least one of the two available angular modes are inserted in the MPMs if the number of available angular modes is 2.

9. The method of claim 1, wherein selecting one or more other MPMs further comprises selecting and inserting an above mode of the above neighboring block in the MPMs and selecting and inserting a left mode of the left neighboring block in the MPMs, and conditionally swapping the top mode and the left mode in the MPMs.

10. The method of claim 1, wherein deriving a plurality of MPMs further comprises determining if an above neighboring block is located in a same Coding Tree Unit (CTU) as the current block, and restrict accessing an intra prediction mode of the above neighboring block during MPM derivation if the above neighboring block and the current block are not located in the same CTU.

11. The method of claim 1, wherein deriving a plurality of MPMs further comprises determining if a left neighboring block is located in a same slice as the current block, and setting an intra prediction mode of the left neighboring block as unavailable for MPM derivation if the left neighboring block and the current block are not located in the same slice.

12. The method of claim 1, wherein encoding or decoding the current block further comprises using one or more bins to signal the current intra prediction mode if the current intra prediction mode belongs to one of the MPMs, wherein a first bin in the one or more bins is context coded.

13. The method of claim 12, wherein one or more bins except for the first bin used to signal the current intra prediction mode are bypass coded.

14. The method of claim 1, wherein encoding or decoding the current block further comprises using one or more bins to signal the current intra prediction mode if the current intra prediction mode belongs to one of the MPMs, wherein only a first bin in the one or more bins is context coded.

15. The method of claim 1, wherein encoding or decoding the current block further comprises using truncated unary coding or fixed length coding to signal the current intra prediction mode if the current intra prediction mode belongs to one of the non-MPMs.

16. An apparatus for processing image or video data by intra prediction in an image or video coding system, the apparatus comprising one or more electronic circuits configured for:
   receiving input data associated with a current block in a current picture, wherein the current block is coded or to be coded by intra prediction;

deriving a plurality of Most Probable Modes (MPMs) to be included in an MPM list for the current block, wherein deriving a plurality of MPMs further comprises determining a number of available angular modes of an above neighboring block and a left neighboring block of the current block, and selecting one or more modes to be inserted in the MPMs according to the number of available angular modes, wherein DC mode, Horizontal mode, and Vertical mode are inserted in the MPMs if the number of available angular modes is 0; and encoding or decoding the current block according to a current intra prediction mode, wherein the current intra prediction mode is belonging to one of the MPMs.

* * * * *